US011978944B2

(12) United States Patent
Benoist et al.

(10) Patent No.: US 11,978,944 B2
(45) Date of Patent: May 7, 2024

(54) DOWNHOLE COMMUNICATION DEVICES AND SYSTEMS

(71) Applicant: Schlumberger Technology Corporation, Sugar Land, TX (US)

(72) Inventors: Xavier Benoist, Stonehouse (GB); Nicolas Mornet, Stonehouse (GB); Alexander Hickson, Stonehouse (GB); Mohamed Abdeliamin Saad, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/628,304

(22) PCT Filed: Jul. 21, 2020

(86) PCT No.: PCT/US2020/042844
§ 371 (c)(1),
(2) Date: Jan. 19, 2022

(87) PCT Pub. No.: WO2021/016224
PCT Pub. Date: Jan. 28, 2021

(65) Prior Publication Data

US 2022/0259970 A1 Aug. 18, 2022

Related U.S. Application Data

(60) Provisional application No. 62/877,644, filed on Jul. 23, 2019.

(51) Int. Cl.
*H01Q 1/04* (2006.01)
*E21B 47/13* (2012.01)
(Continued)

(52) U.S. Cl.
CPC ............... *H01Q 1/04* (2013.01); *E21B 47/13* (2020.05); *H01Q 1/08* (2013.01); *H01Q 7/00* (2013.01)

(58) Field of Classification Search
CPC ............. E21B 47/13; H01Q 1/08; H01Q 7/00
See application file for complete search history.

(56) References Cited

U.S. PATENT DOCUMENTS 4,193,422 A * 3/1980 Rider ...................... F16K 11/02 137/625.49
5,892,460 A * 4/1999 Jerabek .................... G01V 3/28 340/856.4

(Continued)

FOREIGN PATENT DOCUMENTS

EA 034155 B1 1/2020
RU 2162521 C1 1/2001

(Continued)

OTHER PUBLICATIONS

International Search Report and Written Opinion in International Patent Application No. PCT/US2020/042844, dated Oct. 30, 2020, 12 pages.

(Continued)

*Primary Examiner* — Amine Benlagsir

(57) ABSTRACT

A downhole communication includes an antenna winding fixed to an inner surface of a collar. A fluid flow flows through a center of the antenna winding. The antenna winding is wound around a chassis in an antenna channel in the chassis. The chassis is attached to the inner surface of the collar with a seal such that fluid does not travel between the fluid flow and an annulus between the antenna winding and the inner surface of the collar.

21 Claims, 10 Drawing Sheets

(51) Int. Cl.
*H01Q 1/08* (2006.01)
*H01Q 7/00* (2006.01)

(56) References Cited

U.S. PATENT DOCUMENTS

| | | | | |
|---|---|---|---|---|
| 5,939,885 | A * | 8/1999 | McClure | G01V 3/30 175/50 |
| 6,057,784 | A | 5/2000 | Schaaf et al. | |
| 6,392,561 | B1 | 5/2002 | Davies et al. | |
| 9,217,327 | B2 * | 12/2015 | Tarayre | H01Q 7/00 |
| 10,047,602 | B2 | 8/2018 | Turner | |
| 10,408,004 | B2 | 9/2019 | Tubel | |
| 10,539,009 | B2 | 1/2020 | Graf et al. | |
| 10,840,579 | B2 | 11/2020 | Trushin et al. | |
| 11,022,714 | B2 | 6/2021 | Clarkson et al. | |
| 11,108,146 | B2 | 8/2021 | Nguyen et al. | |
| 11,125,902 | B2 | 9/2021 | Ma et al. | |
| 2005/0115708 | A1 | 6/2005 | Jabusch | |
| 2011/0316542 | A1 | 12/2011 | Frey et al. | |
| 2015/0002307 | A1 | 1/2015 | Graf | |
| 2016/0258284 | A1 | 9/2016 | Bittar et al. | |
| 2017/0260845 | A1 * | 9/2017 | Rashid | E21B 49/00 |
| 2017/0350197 | A1 | 12/2017 | Sugiura et al. | |
| 2018/0223645 | A1 * | 8/2018 | Ma | G01V 3/28 |
| 2018/0230777 | A1 | 8/2018 | Bridges et al. | |
| 2022/0259970 | A1 * | 8/2022 | Benoist | H01Q 1/08 |

FOREIGN PATENT DOCUMENTS

| | | | |
|---|---|---|---|
| WO | 9218882 | A1 | 10/1992 |
| WO | 2000047869 | A1 | 8/2000 |
| WO | 2001053855 | A1 | 7/2001 |
| WO | 2017048506 | A1 | 3/2017 |
| WO | 2021016224 | A1 | 1/2021 |

OTHER PUBLICATIONS

Twaites, N., et al., "Use of Near Bit Azimuthal Gamma Ray and Inclination Tool Improves Geosteering in CBM Wells, Airth Field, Scotland", SPE 167700, SPE/EAGE European Unconventional Conference and Exhibition, Vienna, Austria, Feb. 25-27, 2014, 12 pages.

Schlumberger, "Powered Rotary Steerable System Boosts Deepwater Well ROP 257%", Case Study, accessed from: https://www.slb.com/-/media/files/drilling/case-study/pdvortex-angola-deepwater-cs.ashx, 2011, 2 pages.

* cited by examiner

DOWNHOLE COMMUNICATION DEVICES AND SYSTEMS

CROSS-REFERENCE TO RELATED APPLICATIONS

This application claims the benefit of U.S. Provisional Application No. 62/877,644 entitled "Downhole Communication Devices and Systems," filed Jul. 23, 2019, the disclosure of which is incorporated herein by reference.

BACKGROUND OF THE DISCLOSURE

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods may be utilized depending partly on the characteristics of the formation through which the wellbore is drilled.

A drilling system can provide weight on the bit using one or more drill collars positioned in a bottomhole assembly near the bit. Bottomhole assemblies also include communication devices to transmit information about the bit and other downhole parameters to receiving devices uphole from the bit. Conventional drill collars reduce or block the electromagnetic signals transmitted from the communication devices in the bottomhole assembly.

SUMMARY

In some embodiments, a downhole antenna package includes a collar with an inner surface. An antenna winding is fixed to the inner surface of the collar with an offset.

In other embodiments, a collar has an inner surface facing a central bore. An antenna winding is attached to the inner surface and an entirety of a fluid flow through the central bore flows through a center of the antenna winding.

In yet other embodiments, a downhole communication system includes a collar with an inner surface. A chassis includes a first stabilizer point and a second stabilizer point. An antenna winding surrounds at least a portion of the chassis. A distance between the first stabilizer point and the second stabilizer point is less than 150% of an antenna length.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a longitudinal cross-sectional view of a downhole communication system, according to at least one embodiment of the present disclosure;

FIG. 2-2 is a detailed longitudinal cross-sectional view of the downhole communication system of FIG. 2-1, according to at least one embodiment of the present disclosure;

FIG. 2-3 is a transverse cross-sectional view of the downhole communication system of FIG. 2-1, according to at least one embodiment of the present disclosure;

FIG. 3 is longitudinal cross-sectional view of another downhole communication system, according to at least one embodiment of the present disclosure;

FIG. 6-1 is a longitudinal cross-sectional view of yet another downhole communication system, according to at least one embodiment of the present disclosure;

FIG. 6-2 is another longitudinal cross-sectional view of the downhole communication system of FIG. 6-1, according to at least one embodiment of the present disclosure.

DETAILED DESCRIPTION

This disclosure generally relates to devices, systems, and methods for downhole antennas used in downhole communication systems. In some embodiments described herein, a downhole antenna may have a sensitivity of less than 1 nanotesla (nT) while attached to a bottomhole assembly ("BHA").

Figure 1:
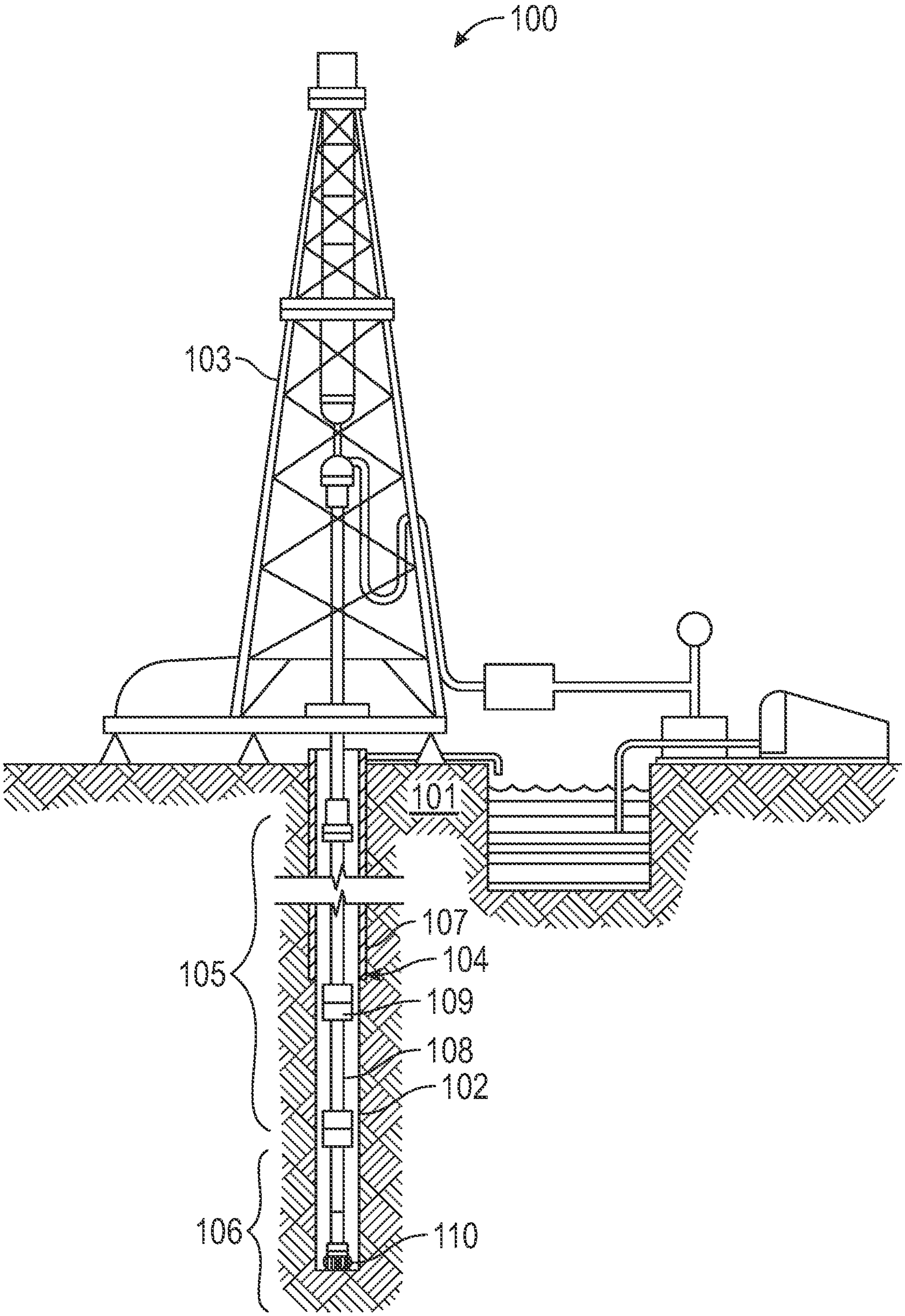
FIG. 1 is a schematic representation of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a BHA 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, steering tools, underreamers, section mills, hydraulic disconnects, jars, vibration or dampening tools, other components, or combinations of the foregoing.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Conventionally, an antenna for a wireless downhole communication system may be mounted on a mandrel located in a central bore of a collar. Fluid flow through the collar may flow around an outer surface of the mandrel (e.g., between the inner surface of the collar and the outer surface of the mandrel). Because of its location inside the collar, a mandrel may protect the antenna from impacts against a borehole wall or a casing. However, the mandrel may vibrate during normal drilling operations. The mandrel, and therefore the antenna, may vibrate with greater frequency and/or amplitude than the collar. The vibration of the mandrel may degrade the signal received and/or transmitted by the antenna, thereby reducing the range and/or reliability of the conventional downhole communication system. Alternatively, conventional downhole communication systems may mount the antenna on an outer surface of the collar. This may reduce the vibrational frequency and/or amplitude experienced by the antenna. However, attaching the antenna to the outer surface of the collar may expose it to damage through contact with the borehole wall or casing, thereby decreasing the service life of the antenna. At least one embodiment described herein overcomes the vibration issues of antennas in a mandrel and the damage issues of external antennas.

Figures 1, 2:
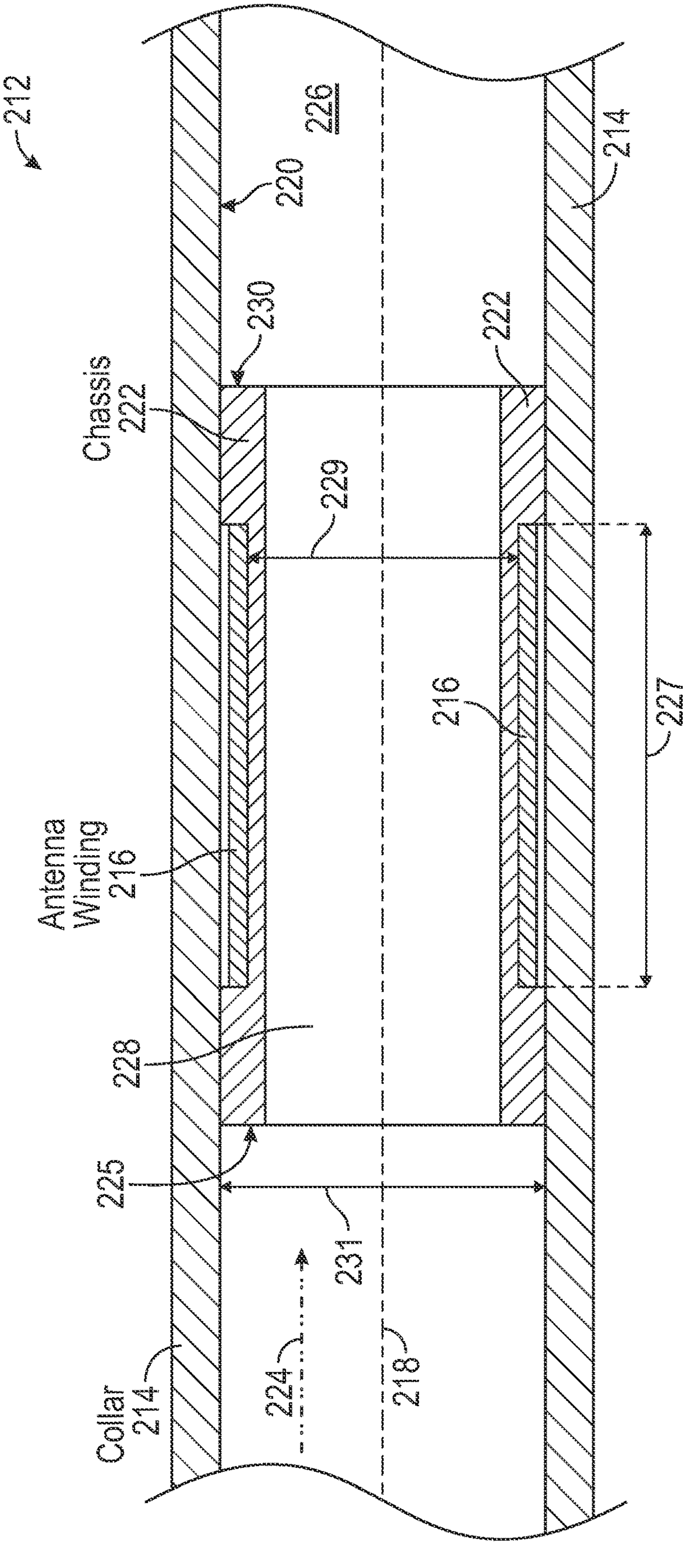
Figure 2:
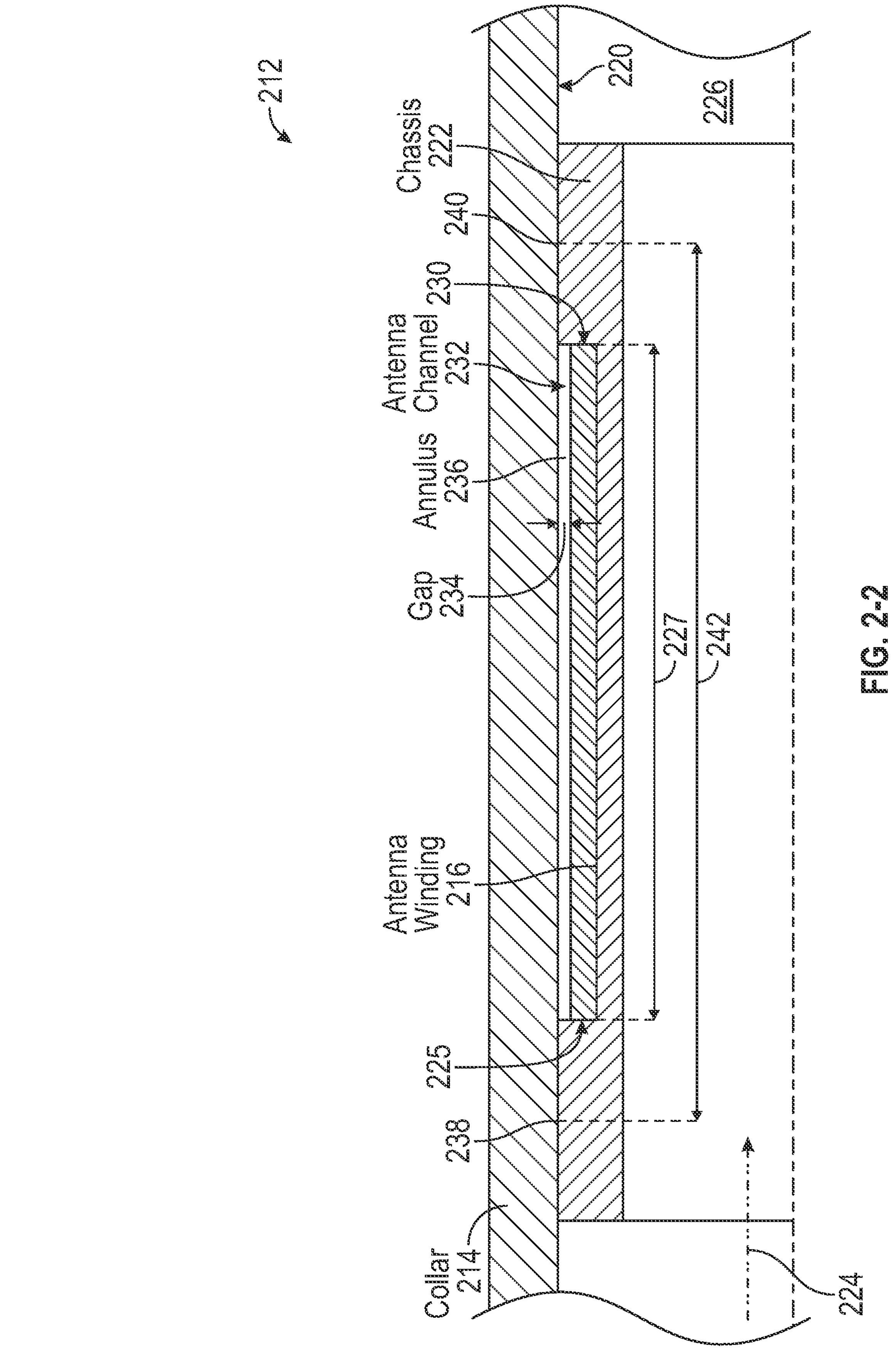

FIG. 2-1 is a cross-sectional view of a representation of a downhole communication system 212, according to at least one embodiment of the present disclosure. The downhole communication system 212 is a wireless communication system. In other words, the downhole communication system 212 is configured to receive and/or transmit wireless signals from other locations downhole and/or on the surface.

The downhole communication system 212 includes an antenna winding 216 fixed to a collar 214. The collar 214 may be any portion of a drill string (e.g., drill string 105 of FIG. 1) or a BHA (e.g., BHA 106 of FIG. 1). For example, the collar 214 may be located on a sub that houses a downhole tool, such as an MWD, an LWD, a mud motor, an expandable tool such as a reamer or a stabilizer, or any other downhole tool. In other examples, the collar 214 may be a tubular member of a drill string connected to a downhole tool or another tubular member of the drill string. In still other embodiments, the collar 214 may be a member of or connected to any other portion of a downhole drilling system. In some embodiments, the antenna winding 216 may be directly fixed to the collar 214. For example, the antenna winding 216 may be fixed to the collar 216 with a mechanical fastener fastened to the inner surface 220 of the collar 216. In other examples, the antenna winding 216 may be fastened to the inner surface 220 of the collar 216 with a weld, a braze, an epoxy, an adhesive, another attachment mechanism, or combinations of the foregoing.

The antenna winding 216 is fixed to an inner surface 220 of the collar 214. For example, in the embodiment shown, the antenna winding 216 is attached to a chassis 222, and the chassis 222 is fixed to the inner surface 220 of the collar. The antenna winding 216 is coaxial with a longitudinal axis 218 of the collar 214. In other embodiments, the antenna winding 216 may have a different longitudinal axis than the longitudinal axis 218 of the collar 214. In some embodiments, the chassis 222 may protect the antenna winding 216 from erosion, corrosion, or other damage caused by drilling fluid or other material flowing through the collar 214.

In some embodiments, the chassis 222 may fix the antenna winding 216 to the inner surface 220 of the collar 214. In other words, the chassis 222 may secure, fix, or hold the antenna winding 216 radially (e.g., perpendicular to the longitudinal axis 218) and/or longitudinally (e.g., parallel to the longitudinal axis 218) to the chassis. For example, the chassis 222 may have a threaded outer surface, and a portion of the inner surface 220 of the collar 214 may be threaded, and the chassis 220 may be threaded to the inner surface 220 of the collar 214. In other examples, the chassis 222 may be secured to the collar 214 using a mechanical fastener, such as a bolt, a screw, a jam nut, or other mechanical fastener. In yet other examples, the chassis 222 may be secured to the collar with a weld, braze, adhesive, other attachment or any combination of attachment mechanisms described herein.

A fluid flow 224, such as drilling mud, flows through a bore (e.g., central bore 226) of the collar 214. In the embodiment shown, the central bore 226 is coaxial with and flows through a center 228 of the antenna winding 216. In other words, the fluid flow 224 flows through the center 228 of the antenna winding 216. In other embodiments, the bore may be offset (e.g., not coaxial with) the center 228 of the antenna winding 216 and/or the longitudinal axis 218. The chassis 222 may be hollow, and the center of the chassis may be the same as the center 228 of the antenna winding 216. Thus, the fluid flow 224 may flow unimpeded or relatively unimpeded from an uphole end 225 of the antenna winding 216 to a downhole end 230 of the antenna winding 216. Thus, the majority of, an entirety of, or all of the fluid flow 224 may flow through the center 228 of the antenna winding 216. In other words, no portion of the fluid flow 224 may flow between the antenna winding 216 and the inner surface 220 of the collar 214. For example, the fluid flow 224 has a mass flow rate between the uphole end 225 and the downhole end 230, and an entirety of the mass flow rate flows through the center 228 of the antenna winding 216. Similarly, the fluid flow 224 has a volumetric flow rate between the uphole end 225 and the downhole end 230, and an entirety of the volumetric flow rate flows through the center 228 of the antenna winding 216. Flowing the fluid through the center 228 of the antenna winding 216 may allow for a shorter chassis 222, which may reduce the total length of the downhole communication system 212.

The antenna winding 216 includes one or more windings or coils of an electromagnetically conductive element (e.g., wire), resulting in an antenna length 227. In other words, the antenna length 227 is the length from a first winding to a final winding of the antenna winding 216. In some embodiments, the antenna winding 216 may include 1, 2, 4, 6, 8, 10, 12, 14, 16, 18, 20, or more windings or coils of the electromagnetically conductive element.

In some embodiments, the antenna length 227 may be in a range having an upper value, a lower value, or upper and lower values including any of 40 millimeters (mm), 50 mm, 75 mm, 100 mm, 150 mm, 200 mm, 250 mm, 300 mm, 350 mm, 400 cmm, 450 cm, 500 cm, or any value therebetween. For example, the antenna length 227 may be greater than 40 mm. In another example, the antenna length 227 may be less than 500 mm. In yet other examples, the antenna length 227 may be any value in a range between 40 mm and 500 mm. In some embodiments, it may be critical that the antenna length 227 is approximately 125 mm for sufficient sensitivity of the antenna winding 216.

The antenna winding 216 further has an antenna diameter 229. The antenna diameter 229 is the interior distance between opposite interior ends of a coil in the antenna winding 216. In some embodiments, the antenna diameter 229 is an inner diameter of the antenna winding 216. The antenna length 227, in combination with the antenna diameter 229 results in an antenna enclosed area. The number of coils of the antenna winding 216, in combination with the enclosed area, may affect the sensitivity of the antenna winding 216. By increasing the antenna enclosed area, the sensitivity of the antenna winding 216 may be increased. For a set number of windings (and therefore antenna length 227), the sensitivity of the antenna winding 216 may be increased by increasing the antenna diameter 229.

In some embodiments, the antenna diameter 229 may be in a range having an upper value, a lower value, or upper and lower values including any of 50 mm, 75 mm, 100 mm, 150 mm, 200 mm, 250 mm, 300 mm, or any value therebetween. For example, the antenna diameter 229 may be greater than 50 mm. In another example, the antenna diameter 229 may be less than 300 mm. In yet other examples, the antenna diameter 229 may be any value in a range between 50 mm and 300 mm. In some embodiments, it may be critical that the antenna diameter 229 of approximately 75 mm for sufficient sensitivity of the antenna winding 216.

The antenna winding 216 has a length to width ratio, which is the ratio of the antenna length 227 to the antenna diameter 229. In some embodiments, the length to width ratio may be in a range having an upper value, a lower value, or upper and lower values including any of 1:5, 1:4, 1:3, 1:2, 1:1, 2:1, 3:1, 4:1, 5:1, or any value therebetween. For example, the length to width ratio may be greater than 1:5. In another example, the length to width ratio may be less than 5:1. In yet other examples, the length to width ratio may be any value in a range between 1:5 and 5:1.

The collar 214 has a collar diameter 231 at the same longitudinal location as the antenna winding 216. The collar diameter 231 may be the same as or greater than the antenna diameter 229. In some embodiments, the collar diameter 231 may be greater than the antenna diameter 229 by double a wire thickness of a wire in the antenna winding 216. In other words, an outer surface of the antenna winding 216 may directly abut or contact the inner surface 220 of the collar 214. In other embodiments, the collar diameter 231 may be greater than the antenna diameter 229 by more than double the wire thickness of the wire. For example, the collar diameter may be greater than the antenna diameter 229 by less than 2.5, 3, 4, 5, 6, 7, 8, 9, 10, or more multiples of the wire thickness of the wire.

In some embodiments, the collar diameter 231 may be greater than the antenna diameter 229 by a collar difference. In some embodiments, the collar difference may be in a range having an upper value, a lower value, or upper and lower values including any of 2 millimeters (mm), 3 mm, 4 mm, 5 mm, 6 mm, 7 mm, 8 mm, 9 mm, 10 mm, 12 mm, 14 mm, 16 mm, 18 mm, 20 mm, 25 mm, or any value therebetween. For example, the collar difference may be greater than 2 mm. In another example, the collar difference may be less than 25 mm. In yet other examples, the collar difference may be any value in a range between 2 mm and 25 mm. In some embodiments, it may be critical that the collar difference is approximately 7.5 mm to maximize the antenna diameter and/or to reduce the reduction in flow area of the central bore.

In some embodiments, the collar 214 may include two or more pipe sections coupled together. For example, the collar 214 may include a box and pin connection. The antenna winding 216 may be secured to the collar 214 between the two ends, e.g., a male end (e.g., the pin) and the female end (e.g., the box) of the collar 214. In other words, the antenna winding 216 may be located between an uphole end and a downhole end of the collar 214, the antenna length being a percentage of a length of the collar 214. In some embodiments, the antenna location may be in a range having an upper value, a lower value, or upper and lower values including any of 10%, 20%, 30%, 40%, 50%, 60%, 70%, 80%, 90% or any value therebetween. For example, the antenna location may be greater than 10%. In another example, the antenna location may be less than 90%. In yet other examples, the antenna location may be any value in a range between 10% and 90%. In some embodiments, it may be critical that the antenna location is between 25% and 75% to provide room for any onboard electronics inside the collar 214. In still other embodiments, the antenna winding 216 may be located on the inner surface 220.

FIG. 2-2 is a detailed cross-sectional view of the downhole communication system 212 of FIG. 2-1, according to at least one embodiment of the present disclosure. As may be seen, the antenna winding 216 is fixed to the inner surface 220 of the collar 214. In the embodiment shown, the antenna winding 216 is wound around the chassis 222. The chassis 222 is connected to the collar 214, thereby fixing the antenna winding 216 to the inner surface of the collar 214.

The chassis 222 may include an antenna channel 232, which is a reduction in the thickness of the chassis 222 where the antenna winding 216 is located. The antenna winding 216 is placed in the antenna channel 232. Therefore, when the chassis 222 is secured to the collar 214, the antenna winding 216 is also secured or fixed to the collar 214. When the antenna winding 216 is placed in the antenna channel 232, the antenna winding 216 (e.g., an outer surface of the antenna winding 216) is radially offset or spaced from the inner surface 220 by a gap 234. In other words, an annulus 236 may exist between the antenna winding 216 and the inner surface 220 of the collar 214. In some embodiments, the annulus 236 may be filled with a gas, such as air from the surface or an inert gas such as nitrogen. In other embodiments, the annulus 236 may be filled with a fluid, such as drilling fluid. In yet other embodiments, the annulus 236 may be filled with a solid, such as epoxy or rubber.

In some embodiments, the gap 234 may less than 5 millimeters (mm). In other embodiments, the gap 234 may be less than 3 mm. In yet other embodiments, the gap 234 may be less than 2 mm. In further embodiments, the gap 234 may be less than 1 mm. In still further embodiments, the gap 234 may be 0 mm, or in other words, the antenna winding 216 may directly abut or directly contact the inner surface 220 of the collar 214. In some embodiments, it may be critical that the gap 234 is less than 3 mm for the sensitivity of the antenna winding 216. Furthermore, decreasing the gap 234 may increase the antenna diameter (e.g., antenna diameter 229 of FIG. 2-1), thereby increasing the enclosed area.

Downhole drilling systems experience many different forces, torques, shocks and motions. At least some of these forces, torques, and motions may result in a vibration of the downhole drilling system. The vibration may be transferred through the downhole drilling system to the collar 214 and/or other elements of the downhole drilling system, such as the chassis 222 and the antenna winding 216. Motion of the antenna winding 216 may cause fluctuations in the electromagnetic field around the antenna winding 216. In some embodiments, the fluctuations in the electromagnetic field around the antenna winding 216 may cause interference in the receipt and/or transmission of an electromagnetic signal. In some embodiments, an increase in the frequency and/or amplitude of the vibration of the antenna winding 216 may increase the interference in the receipt and/or transmission of the electromagnetic signal.

Downhole wireless communication systems may be low power systems. In some embodiments, an antenna winding 216 may sense variations in the surrounding electromagnetic field of less than 1 nanotesla (nT). In other embodiments, an antenna winding 216 may sense variations in the surrounding electromagnetic field of less than 0.1 nT. The sensitivity of the antenna winding 216 may affect the vibrational frequency that interferes with the receipt and/or transmission of signals by the antenna winding 216. Therefore, by reducing the vibrations experienced by the antenna winding 216, the antenna winding 216 may be able to receive and/or transmit signals with greater accuracy and/or clarity.

The chassis 222 includes a first stabilization point 238 and a second stabilization point 240. The first stabilization point 238 is located uphole of the antenna winding 216 or uphole of the uphole end 225 of the antenna winding 216. The second stabilization point 240 is located downhole of the antenna winding 216 or downhole of the downhole end 230 of the antenna winding 216. The stabilization distance 242 is the distance between the first stabilization point 238 and the second stabilization point 240.

The stabilization distance 242 is a stabilization percentage of the antenna length. In some embodiments, the stabilization percentage may be in a range having an upper value, a lower value, or upper and lower values including any of 100%, 110%, 120%, 125%, 130%, 140%, 150%, 175%, 200%, 250%, 300%, or any value therebetween. For example, the stabilization percentage may be 100% (e.g., the chassis 222 may be stabilized at the uphole end 225 and the downhole end 230 of the antenna winding 216). In another example, the stabilization percentage a maximum of 300%. In yet other examples, the stabilization percentage may be any value in a range between 100% and 300%. In some embodiments, it may be critical that the stabilization percentage is less than 150% to stabilize the chassis 222 and the antenna winding to the collar 214.

A chassis 222 with long stabilization distance 242 may vibrate with a resonant frequency that is higher than the vibration frequency of the collar 214. Furthermore, a larger gap 234 may increase the vibration amplitude of the antenna winding 216 compared to the collar 214. An increase in the frequency and/or the amplitude of the vibration of the antenna winding 216 may increase the interference in the receipt and/or transmission of the electromagnetic signal. Therefore, by decreasing one or both of the stabilization distance 242 or the gap 234, the interference in the receipt and/or transmission of the electromagnetic signals may be reduced. Reducing the interference may increase accuracy of received and/or transmitted signals, and/or increase the range of the downhole communication system 212.

In at least one embodiment, a low stabilization percentage and/or a low gap 234 may stabilize the chassis 222 and/or the antenna winding 216 to the collar such that the antenna winding 216 vibrates at the or at substantially the same frequency and amplitude as the collar. In other words, fixing the antenna winding 216 to the inner surface 220 of the collar 214 may reduce the vibration of the antenna winding 216 until the antenna winding vibrates in synch or simultaneously with the collar 214. In this manner, the interference in signal receipt and/or transmission may be reduced or eliminated.

Fixing the antenna winding 216 to the inner surface 220 of the collar 214 may reduce the length of the downhole communication system 212 by eliminating the need for a mandrel. Furthermore, the chassis 222 may be fabricated from a wear and/or erosion resistant material. In this manner, the chassis 222 may protect the antenna winding 216 from wear and/or erosion from the fluid flow 224. By placing the antenna winding 216 inside the collar 214, the antenna winding 216 may be protected from contact with the borehole wall. Thus, the antenna winding 216 may be cheaper to manufacture and have a longer operation lifetime.

Figures 2, 3:
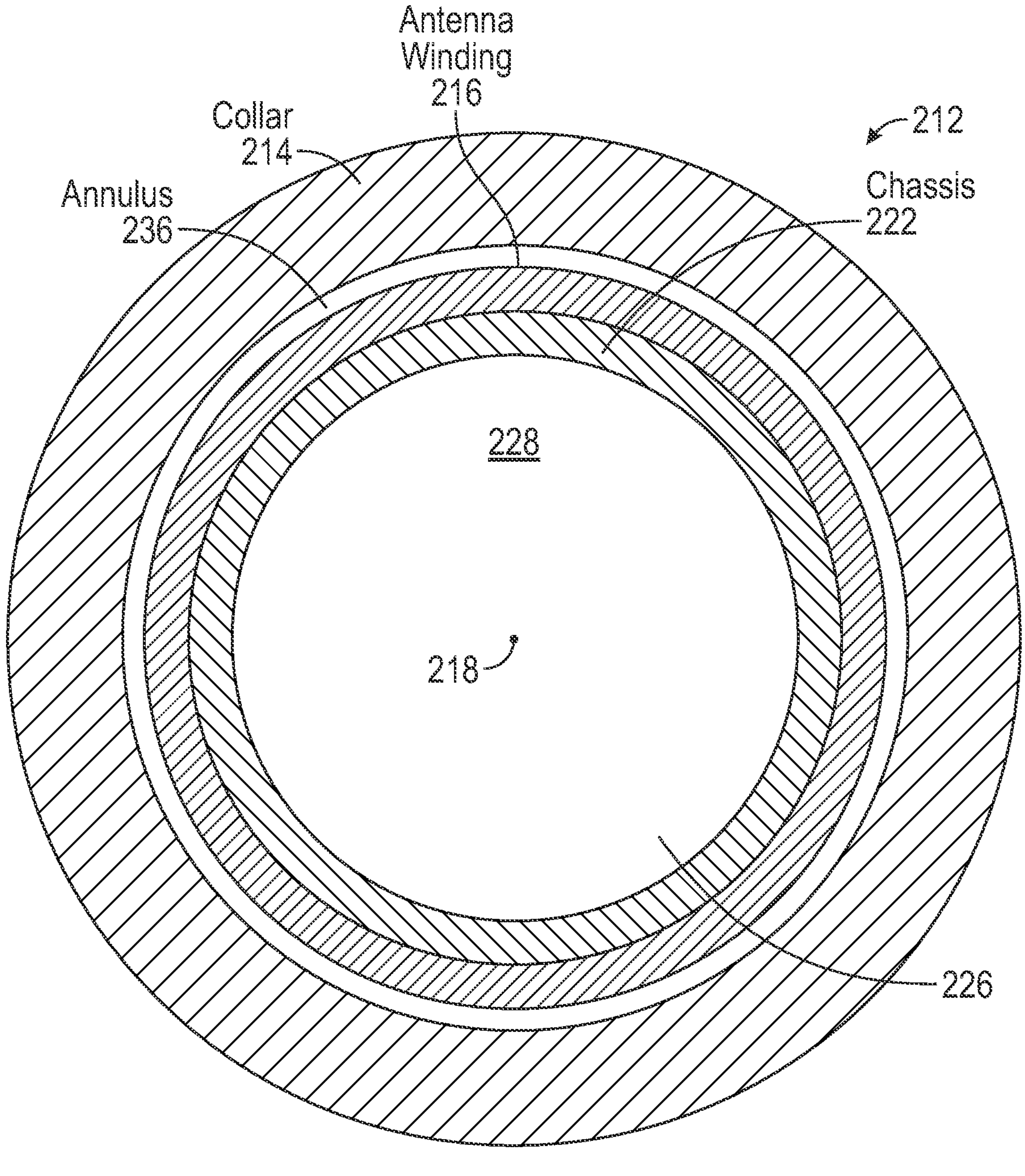
Figure 3:
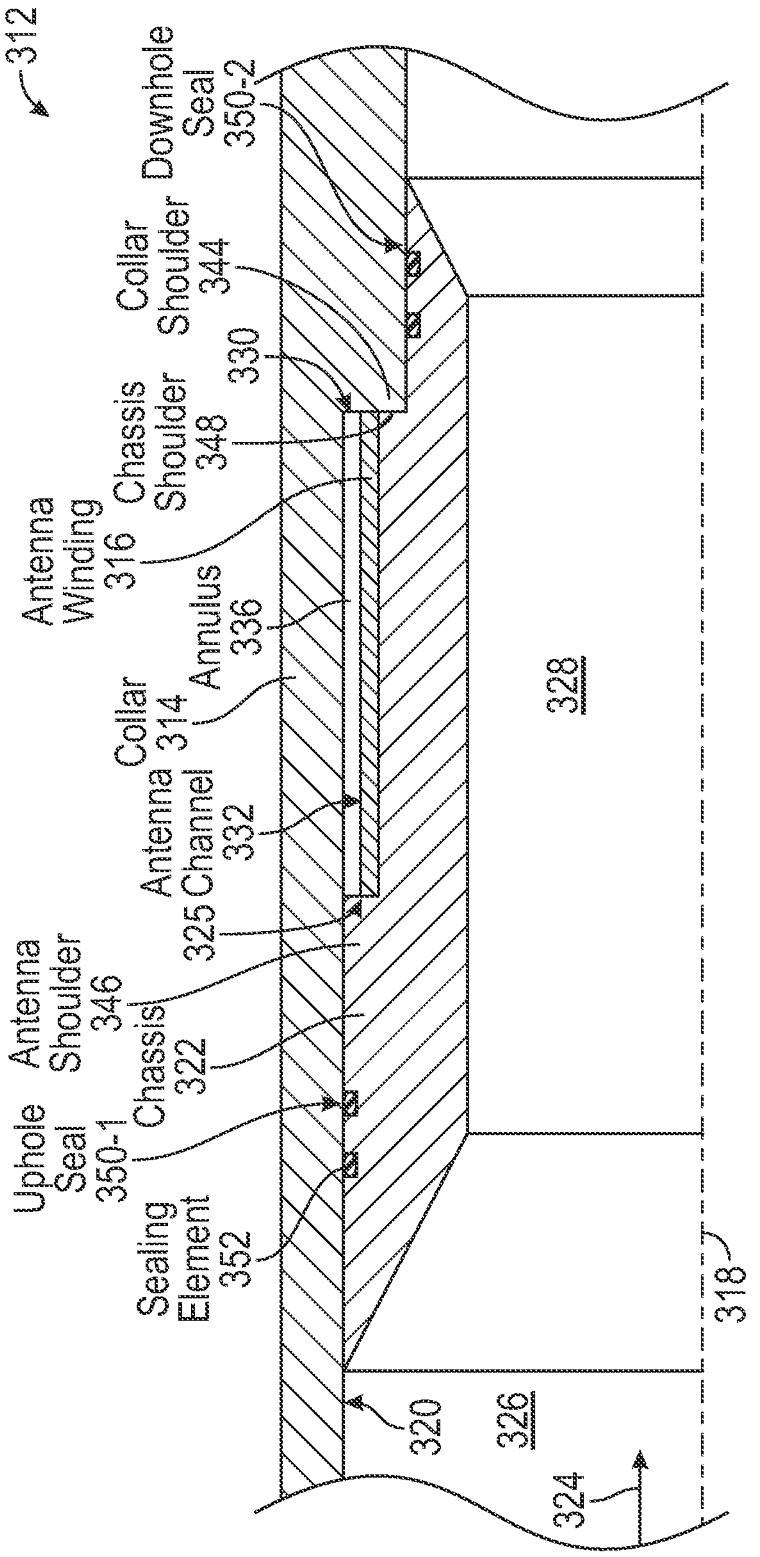

FIG. 2-3 is a transverse cross-sectional view of the downhole communication system 212 of FIG. 2-1, according to at least one embodiment of the present disclosure. As may be seen, the antenna winding 216 is internal to the collar 214 and concentric with the collar 214 about the longitudinal axis 218. The antenna winding 216 is supported by the chassis 222. The chassis 222 surrounds the central bore 226 of the collar 214. In the cross-sectional view shown, the central bore 226 runs through the center 228 of the antenna winding 216.

A fluid flow (e.g., the fluid flow 224 of FIG. 2-1) flows through the central bore 226 of the collar, and therefore through the center 228 of the antenna winding 216. The antenna winding 216 may have a smaller antenna diameter (e.g., antenna diameter 229 of FIG. 2-1) than the collar diameter (e.g., the collar diameter 231 of FIG. 2-1). Thus, there is an annulus 236 between the antenna winding 216 and the collar 214. The annulus may be filled with any material, such as atmospheric gas, drilling fluid, epoxy, or other material. In some embodiments, no fluid from the fluid flow may enter the annulus 236. In some embodiments, while mud is being pumped downhole from the surface, fluid flows through the center 228 and does not flow through the annulus 236, and while some fluid may enter the annulus 236, it does not substantially flow through the annulus 236.

FIG. 3 is a representation of a cross-sectional view of a downhole communication system 312, according to at least one embodiment of the present disclosure. An antenna winding 316 is attached to an inner surface 320 of a collar 314. A chassis 322 secures the antenna winding 316 to the inner surface 320.

In the embodiment shown, the collar 314 includes a collar shoulder 344. The collar shoulder 344 is a portion of the collar 314 with an increased thickness. In some embodiments, the collar shoulder 344 may extend perpendicularly from the inner surface 320 of the collar. In other embodiments, the collar shoulder 344 may extend from the inner surface 320 with an acute or an obtuse angle. In some embodiments, the collar 314 has a first diameter that extends from a first end of the collar 314 to the collar shoulder 344. At the collar shoulder 344, the collar 314 increases in diameter to a second diameter that extends from the collar shoulder 344 to a second end of the collar 314.

The antenna winding 316 is installed on the inner surface 320 next to the collar shoulder 344 at a downhole end 330 of the antenna winding 316. For example, the antenna winding 316 may be within 5 mm of the collar shoulder 344. In some embodiments, the antenna winding 316 may abut (e.g., a longitudinally outermost winding may directly contact) the collar shoulder 344. Installing the antenna winding 316 against the collar shoulder 344 may stabilize the antenna winding 316 from downhole motion parallel with the longitudinal axis 318.

The chassis 322 includes an antenna channel 332, in which the antenna winding 316 is secured to the chassis 322. In the embodiment shown, the antenna channel 332 includes an antenna shoulder 346 and a chassis shoulder 348. The antenna winding 316 may be secured to the antenna channel 332 next to or abutting up against the antenna shoulder 346 at an uphole end 325 of the antenna winding 316. The antenna shoulder 346 may stabilize the antenna winding 316 from uphole motion parallel with the longitudinal axis 318. In some embodiments, the antenna winding 316 may be secured to the chassis 322 using a mechanical fastener, such as a screw, a bolt, a nut, or any other mechanical fastener. In other embodiments, the antenna winding 316 may be secured to the chassis 322 with epoxy, resin, or other hardened polymers, monomers, and so forth. In still other embodiments, the antenna winding 316 may be secured to the chassis 322 using a weld, solder, braze, and the like.

The chassis 322 may be secured to or fixed to the inner surface 320 of the collar 314. The chassis may be secured to the inner surface 320 of the collar 314 at the collar shoulder 344. In other words, the chassis shoulder 348 may contact, rest against, or be supported by the collar shoulder 344 of the collar 314. In some embodiments, the chassis 322 may be connected to the collar 314 with a threaded connection, a bolted connection, one or more jam nuts, weld, braze, or other connection. By securing the chassis shoulder 348 to the collar shoulder 344, the chassis 322 may be secured to the collar 314, and stabilized by the collar 314. This may reduce the amount of independent vibration experienced by the chassis 322, and therefore the antenna winding 316. When the chassis 322 is secured to the collar 314 at the collar shoulder 344, the antenna winding 316 may be secured against uphole longitudinal movement by the antenna shoulder 346 and downhole longitudinal motion by the collar shoulder 344 or by a mechanical fastener or other fastener that connects the antenna winding 316 to the chassis 322.

A fluid flow 324 may flow through a central bore 326 of the collar 314 and through the center 328 of the antenna winding 316. The chassis 322 includes a seal (collectively 350) to seal the antenna winding 316 from the fluid flow 324. The seal 350 includes an uphole seal 350-1 uphole of the antenna winding 316 and a downhole seal 350-2 downhole of the antenna winding. Both the uphole seal 350-1 and the downhole seal 350-2 include a sealing element, such a one or more O-rings 352. For example, in the embodiment shown, the uphole seal 350-1 and the downhole seal 350-2 include two O-rings to provide increased seal for a high pressure differential. In this manner, the antenna winding 316 may be sealed from the central bore 326 and the fluid flow 324. In other words, in some embodiments, no portion of the fluid flow 324 may contact the antenna winding 316.

In some embodiments, an annulus 336 between the antenna winding 316 and the collar 314 may have an annular pressure that is a different pressure than a bore pressure in the central bore 326. This may be a result of the downhole communication system 312 being assembled on the surface, which may seal the annulus 336 from the central bore 326 at atmospheric pressure. As the downhole communication system 312 is tripped into a wellbore, or as the wellbore advances through drilling, the bore pressure in the central bore 326 may increase, which may increase the pressure differential between the annular pressure in the annulus 336 and bore pressure in the central bore 326. In some embodiments, the chassis 322 may be designed to maintain the differential pressure between the central bore 326 and the annulus 336. In this manner, the antenna winding 316 may not be subjected to high pressures. In this manner, the antenna winding 316 may be fabricated from more cost-effective parts, which may reduce the total cost of drilling. In other embodiments, the annulus 336 may include a pressure relief system. In this manner, the pressure differential between the annular pressure and the bore pressure may be equalized, which may improve performance of the antenna winding 316.

The fluid flow 324 may be directional, meaning that the fluid may originate at the surface, flow through the drill string to the collar 314, and flow through the collar 314 and the antenna winding 316. In the embodiment shown, the fluid flows from the left to the right. In this manner, fluid enters the center 328 of the antenna winding 316 from the uphole end 325 of the antenna winding 316 and exits the center 328 from the downhole end 330 of the antenna winding. In some embodiments, no portion of the fluid flow 324 that travels from the uphole end 325 to the downhole end 330 may enter the annulus 336.

In other embodiments, the pressure equalization system may include a single port into the annulus 336. Thus, as the downhole communication system 312 is tripped downhole, and to equalize the pressure between the annulus 336 and the central bore 326, a portion of fluid from the fluid flow may enter the annulus 336 through the single port. When the downhole communication system 312 is tripped back uphole, the portion of the fluid flow may exit the annulus 336 through the single port. Therefore, fluid does not flow through the annulus 336. In other words, fluid does not enter the annulus 336 from a first port and exit the annulus from a second, different port. Rather, fluid may enter and exit the annulus 336 from the same, single port.

In still other embodiments, the single port may include a membrane separating the annulus 336 from the central bore 326. The annulus 336 may be filled with a liquid, such as hydraulic oil or another liquid. As the pressure differential increases, the membrane may be pushed toward the annulus 336. This may increase the pressure of the liquid in the annulus 336, thereby equalizing the pressure between the annulus 336 and the central bore 326. A membrane may reduce the contact of the antenna winding 316 with the drilling fluid, which may reduce wear on the antenna winding.

Figure 4:
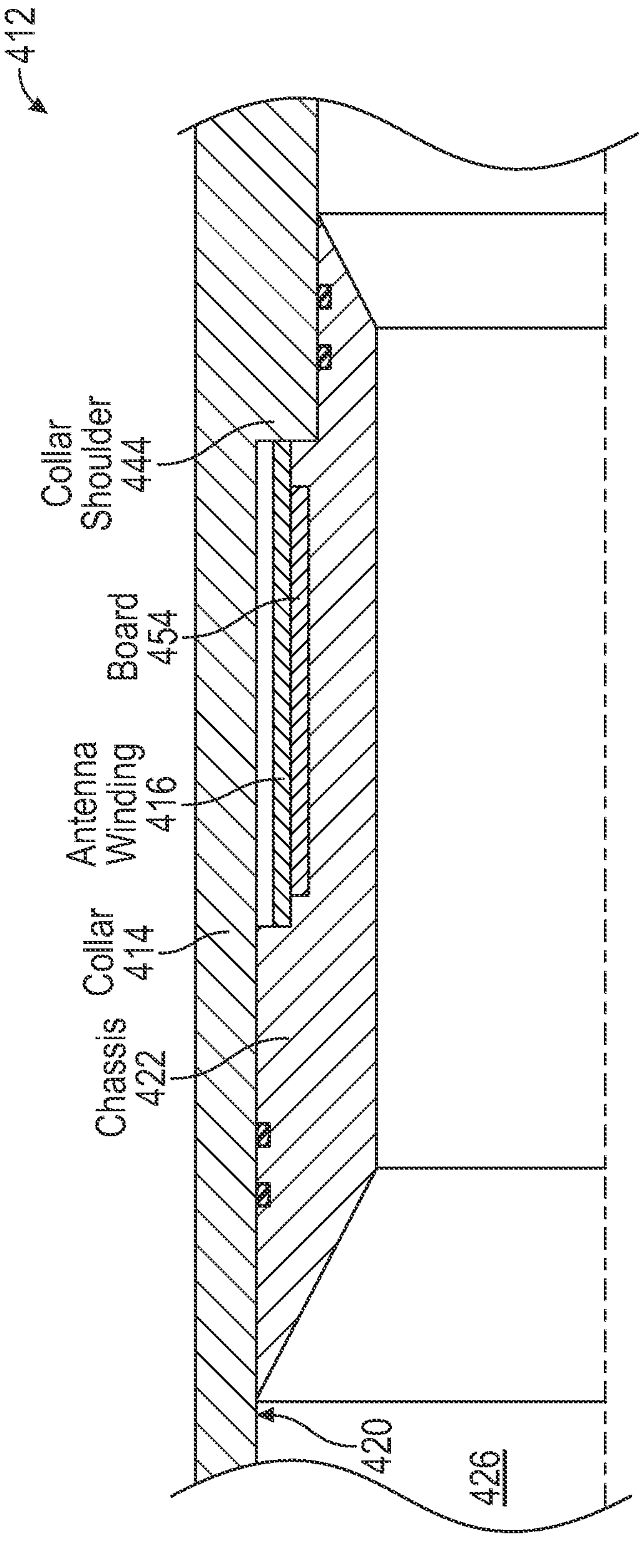
FIG. 4 is a longitudinal cross-sectional view of still another downhole communication system, according to at least one embodiment of the present disclosure.

FIG. 4 is a representation of a cross-sectional view of a downhole communication system 412, according to at least one embodiment of the present disclosure. In the embodiment shown, a board 454 extends from a collar shoulder 444 extending from an inner surface 420 of a collar 414. The board 454 is offset from the inner surface 420. In some embodiments, the board 454 includes a sensor, such as a nuclear sensor or other type of sensors. In the same or other embodiments, the board 454 may include a printed circuit board and one or more processors. The board 454 may be attached to the chassis 422 with a mechanical fastener, and the antenna winding 416 may be fixed or attached to the chassis 422 above the board 454. In this manner, the chassis 422 radially secures the antenna winding 416 and the board 454 to the inner surface 420 of the collar 414. In the embodiment shown, a single board 454 may secure the antenna winding 416 to the inner surface 420 of the collar 414. In other embodiments, a plurality of boards 454, including 2, 3, 4, 5, 6, 7, 8, or more boards 454 may secure the antenna winding to the inner surface 420.

In the embodiment shown, a chassis 422 longitudinally secures the antenna winding 416 to the inner surface 420. In this manner, the chassis 422 may provide erosion and/or wear protection and a seal between the antenna winding 416 and the central bore 426 of the collar 414 and the chassis 422 may provide the winding 416 protection from the pressure. In other embodiments, the antenna winding 416 may be longitudinally secured to the collar 414 by the collar shoulder 444 and a set screw or other mechanical connection uphole of the antenna winding 416. Having the antenna coil 416 overlapping the board 454 may reduce the length of the chassis 422. In this manner, the length of the downhole communication system 412 may be reduced. In this manner, the distance between the transmitter and the receiver may be reduced, which may increase the reliability of the downhole communication system 412. Furthermore, in some embodiments, the antenna winding 416 may be electrically connected to the board 454 where the board 454 is an electronic circuit board. This may further reduce the complexity of the downhole communication system 412, which may improve its reliability.

Figure 5:
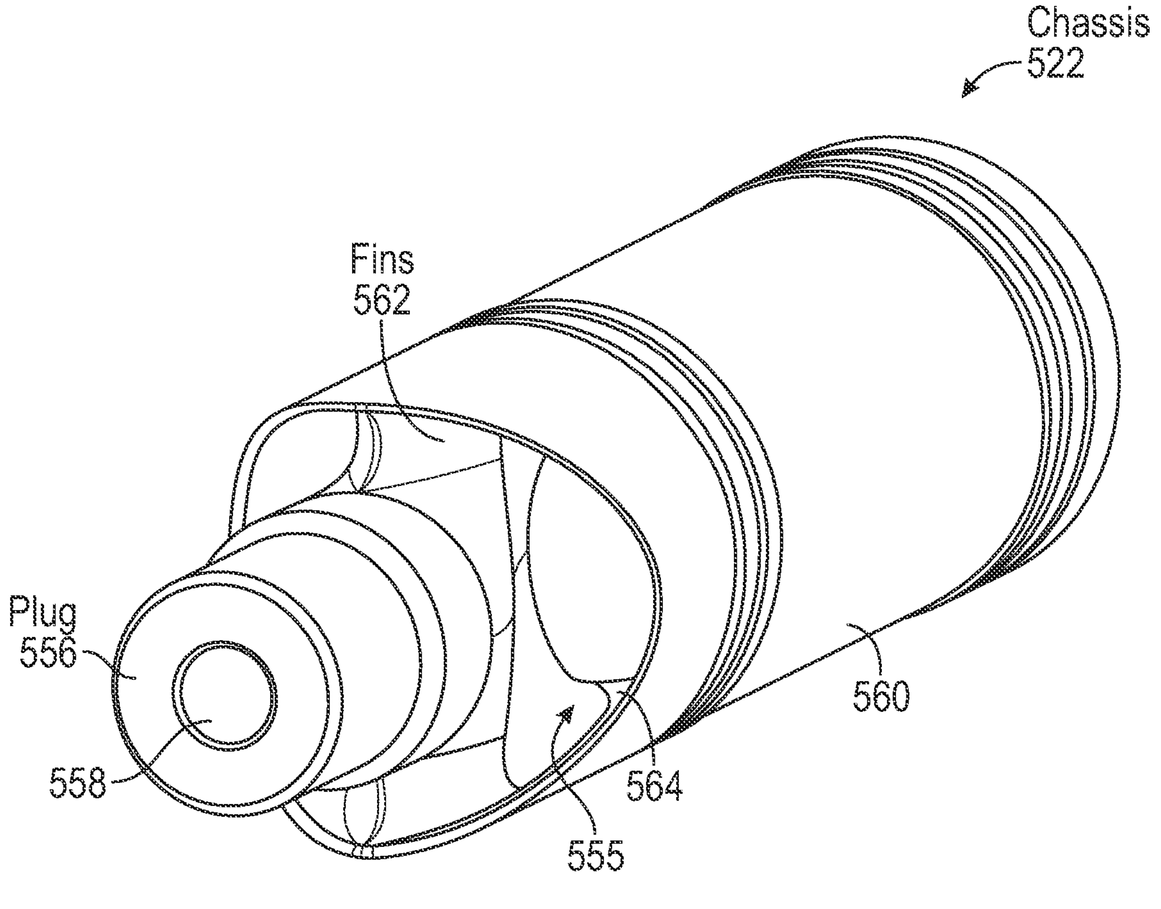
FIG. 5 is a perspective view of a chassis, according to at least one embodiment of the present disclosure.

FIG. 5 is a perspective view of a chassis 522, according to a least one embodiment of the present disclosure. In some embodiments, the chassis 522 includes a flow diverter 555. The flow diverter 555 may direct a fluid flow that flows through an annular space to tubular space.

The flow diverter 555 includes a central connection 556. In some embodiments, the central connection 556 may be configured to connect to an electronics package. In other embodiments, the central connection 556 may be configured to connect to any downhole tool, such as a mud motor, an expandable tool, and MWD, an LWD, a mud pulse generator, or any other downhole tool. The central connection 556 includes a plug 558. The plug may be configured to electronically connect an antenna (e.g., antenna winding 216 of FIG. 2-1) to the downhole tool.

The central connection 556 connects to a cylindrical body 560 of the chassis 522 using one or more fins 562. Fluid may flow around an outside of the central connection 556 and into an interior of the cylindrical body 560. The fluid may be at least partially directed by the one or more fins 562 and/or an angled portion 564 of the cylindrical body 560.

FIC. 6-1 is a longitudinal cross-sectional view of a downhole communication system 612, according to at least one embodiment of the present disclosure. In the embodiment shown, the chassis 622 is similar to the chassis 522 of FIG. 5. The chassis 622 secures an antenna winding 616 to an inner surface 620 of the collar 614. The chassis 622 includes a flow diverter 655 configured to divert a fluid flow (collectively 624) from an annular flow (e.g., around a tool component) to a tubular flow (e.g., central to the antenna winding 616).

The flow diverter 655 includes a central connection 656. The central connection 656 is configured to connect to a downhole tool 661. The downhole tool 661 may include any downhole tool 661 used in a downhole environment, including an electronics package, a processor, a mud motor, an expandable tool, an MWD, an LWD, a mud pulse generator, or any other downhole tool or component. The central connection 656 includes a plug 658. The plug 658 may electronically connect the antenna winding 616 to the downhole tool 661.

The downhole tool 661 may be located in a center of a central bore 626. The fluid flow 624 may flow around the downhole tool 661 in an annular flow 624-1. Downhole of the downhole tool 661, the fluid flow 624 flows through the flow diverter 655 in a diverted flow 624-2. The fluid flow 624 may then be directed to a tubular flow 624-3. An entirety of the fluid flow 624 may be diverted from the annular flow 624-1 to the tubular flow 624-3. In other words, none of the fluid flow 624 may flow between the antenna winding 616 and the collar 614. The flow diverter 655 includes a fin 662 and an angled portion 664 of a cylindrical body 660 of the chassis 622. The fin 662 and the angled portion 664 are sloped and hydrodynamically optimized to limit any hydrodynamic losses from the flow diverter 655.

The chassis 622 is longitudinally secured to the collar 614 at a shoulder 644. In some embodiments, the downhole tool 661 may apply a force to the chassis 622 that pushes the chassis 622 against the shoulder 644. This may help to longitudinally and rotationally fix the chassis 622, and therefore the antenna winding 616, to the collar 614. This in turn, may reduce electromagnetic interference in the signal received and/or transmitted by the antenna winding 616.

The collar 614 may include a necked portion 666. A thickness of the collar 614 wall may be reduced in the necked portion 666 at the antenna winding 616. This may reduce the magnetic interference from the collar 614, thereby improving the signal received and/or transmitted by the antenna winding 616.

Figures 1, 6:
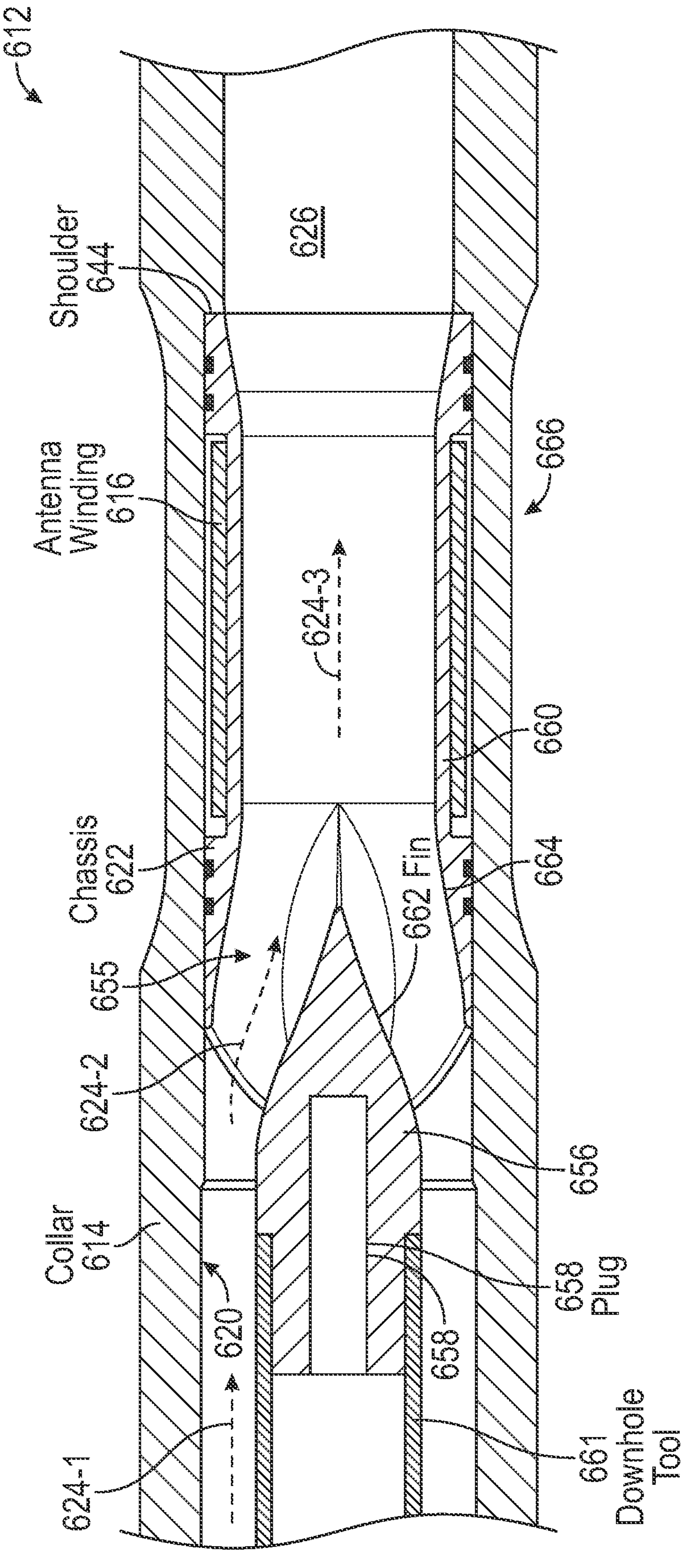
Figures 2, 6:
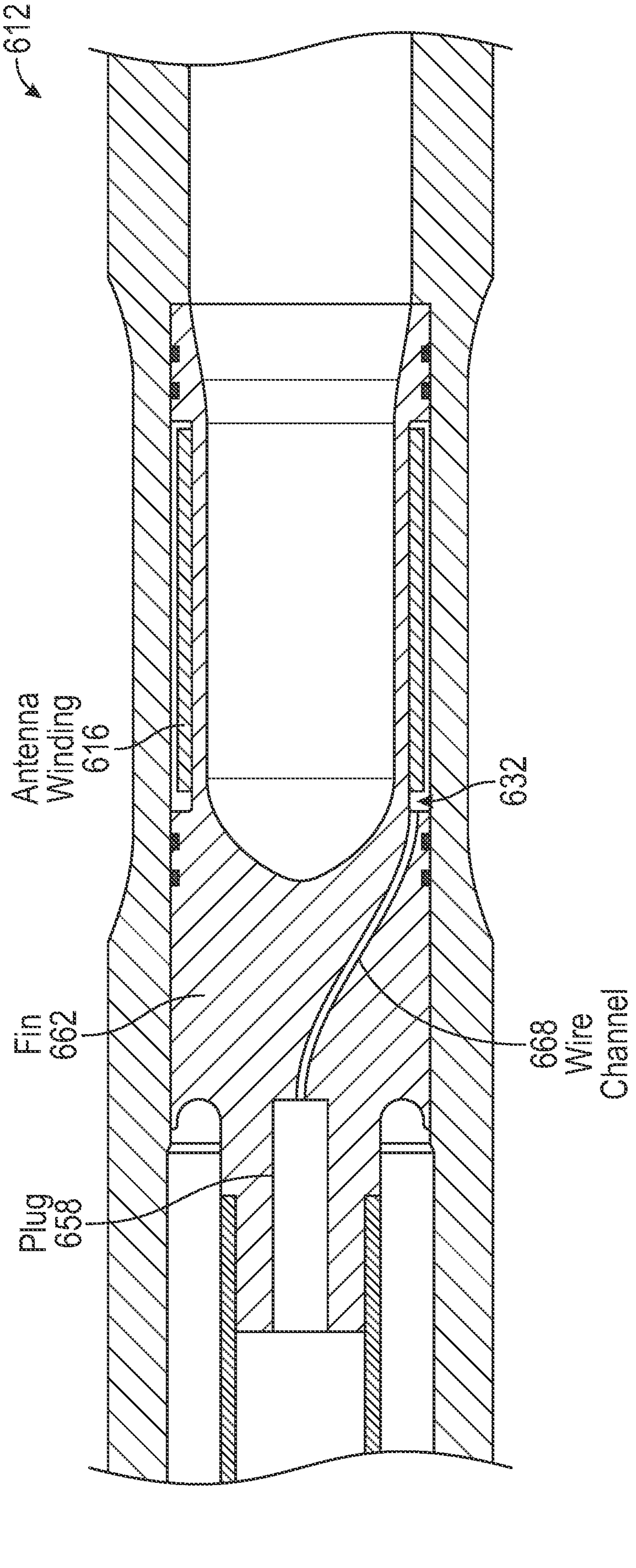

FIG. 6-2 is another longitudinal cross-sectional view of the downhole communication system 612 of FIG. 6-1. This cross-sectional view is taken parallel to a length of the fins 662. At least one of the fins 662 includes a wire channel 668 connected to the plug 658. The wire channel 668 is connected to the antenna channel 632. In this manner, a wire passed through the wire channel 668 may be connected to the antenna winding 616 and any electronics plugged into the plug 658. In this manner, each of the portions of the antenna, including the antenna winding 616 and the wire, may be protected from wear and/or erosion caused by the drilling fluid.

To ensure the structural integrity of the fin 662, the wire channel 668 may pass through the thickest portion of the fin 662. The wire channel 668 may include one or more bends (e.g., inflection points) to reach the antenna winding 616. For example, in the embodiment shown, the wire channel includes a first bend near the plug 658 and a second bend near the wire channel 668. Furthermore, in some embodiments, the wire channel 668 may have a circular cross-sectional shape. In other embodiments, the wire channel 668 may have a non-circular cross-sectional shape, such as an elliptical shape, square, rectangular, or any other shape.

The chassis 622, including the flow diverter 655, the fins 662, and the wire channel 668, may be expensive, time consuming, or even impossible to machine from a block or tube of steel. In some embodiments, to achieve the complex geometry of the flow diverter and the wire channel 668, the chassis 622 may be manufactured using additive manufacturing techniques. For example, the chassis 622 may be manufactured with an additively manufactured metal. In other embodiments, the chassis may be manufactured using injection molding techniques, including injection molding of hardened plastics and other polymers and polymeric compounds.

Figure 7:
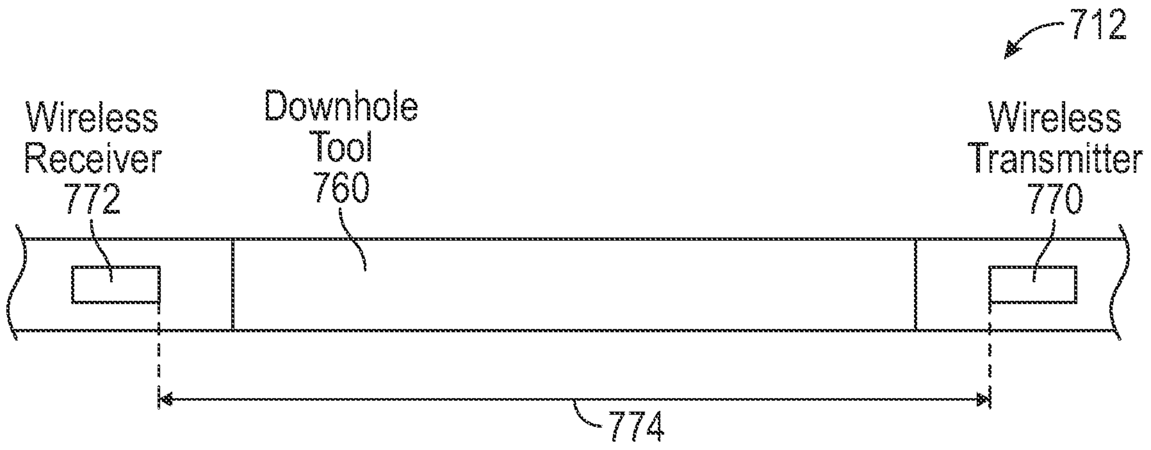
FIG. 7 is a schematic representation of a downhole communication system, according to at least one embodiment of the present disclosure.

FIG. 7 is a schematic representation of a downhole communication system 712, according to at least one embodiment of the present disclosure. The downhole communication system 712 includes a wireless transmitter 770, a wireless receiver 772, and a downhole tool 760 between the wireless transmitter 770 and the wireless receiver 772. In some embodiments, the wireless receiver 772 includes an antenna winding (e.g., antenna winding 216 of FIG. 2-1) according to the present disclosure. In other embodiments, the wireless transmitter 770 includes an antenna winding according to the present disclosure. In still other embodiments, both the wireless receiver 772 and the wireless transmitter 770 include an antenna winding according to the present disclosure. In some embodiments, the wireless receiver 772 may be configured to both receive and transmit wireless signals and the wireless transmitter 770 may be configured to both transmit and receive wireless signals. In this manner, the downhole communication system 712 may be a two-way communication system.

The wireless transmitter 770 may transmit wireless signals and the wireless receiver 772 may receive the wireless signals. The downhole communication system has a signal range 774 between the wireless transmitter 770 and the wireless receiver 772.

In some embodiments, the wireless receiver 772 may receive signals from the wireless transmitter 770 with a signal strength. In some embodiments, the signal strength may be in a range having an upper value, a lower value, or upper and lower values including any of $1\times10^{-13}$ Tesla (T), $1\times10^{-12}$ T, $1\times10^{-11}$ T, $1\times10^{-10}$ T, $1\times10^{-9}$ T, $1\times10^{-8}$ T, $1\times10^{-7}$ T, or any value therebetween. For example, the signal strength may be greater than $1\times10^{-13}$ T. In another example, the signal strength may be less than $1\times10^{-7}$ T. In yet other examples, the signal strength may be between $1\times10^{-7}$ T and $1\times10^{-13}$ T. In some embodiments, it may be critical that the signal strength is greater than $1\times10^{-13}$ T to increase the signal range 774. A greater signal strength may increase the signal range 774.

The embodiments of the downhole communication system have been primarily described with reference to wellbore drilling operations; the downhole communication systems described herein may be used in applications other than the drilling of a wellbore. In other embodiments, downhole communication systems according to the present disclosure may be used outside a wellbore or other downhole environment used for the exploration or production of natural resources. For instance, downhole communication systems of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. References to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. Changes that come within the meaning and range of equivalency of the claims are to be embraced within their scope.

What is claimed is:

1. A downhole antenna, comprising:

a collar including an inner surface that forms a central bore extending through the collar, wherein the central bore provides for fluid flow through the collar;

a chassis disposed inside the central bore of the collar and mechanically secured to the inner surface of the collar, wherein the chassis includes an inner annular surface that forms a secondary bore extending through the chassis and the chassis includes an outer surface facing the inner surface of the collar, wherein the secondary bore is coaxially aligned with the central bore of the collar and the secondary bore provides for the fluid flow through the collar and the chassis; and an antenna winding disposed between the outer surface of the chassis and the inner surface of the collar.

2. The downhole antenna according to claim 1, further comprising:

a gap between the antenna winding and the inner surface of the collar, wherein the gap is less than 3 millimeters.

3. The downhole antenna according to claim 1, wherein the antenna winding directly abuts the inner surface of the collar.

4. The downhole antenna according to claim 1, wherein the collar has a collar diameter and the antenna winding has an antenna diameter, the antenna winding includes a wire having a wire thickness, and the collar diameter is larger than the antenna diameter by double the wire thickness.

5. The downhole antenna according to claim 1, wherein the antenna winding is configured to vibrate at a same frequency as the collar.

6. The downhole antenna according to claim 1, further comprising:

an electronics board fixed to the collar, wherein at least a portion of the antenna winding is fixed to the inner surface of the collar between the electronics board and the inner surface of the collar.

7. The downhole antenna according to claim 1, wherein the collar includes a collar shoulder disposed next to the antenna winding.

8. The downhole antenna according to claim 1, wherein the central bore of the collar and the secondary bore of the chassis have colinear central axes.

9. The downhole antenna according to claim 1, wherein the chassis includes a seal between the antenna winding and the central bore of the collar.

10. The downhole antenna according to claim 9, wherein the seal is configured to prevent the fluid flow in the central bore of the collar from entering an annulus between the inner surface of the collar and the antenna winding.

11. The downhole antenna according to claim 9, wherein the seal includes an uphole seal uphole of the antenna winding and a downhole seal downhole of the antenna winding.

12. The downhole antenna according to claim 1, wherein the chassis is configured to longitudinally fix the antenna winding to the inner surface of the collar.

13. The downhole antenna according to claim 1, wherein the chassis is configured to radially fix the antenna winding to the inner surface of the collar.

14. The downhole antenna according to claim 1, further comprising:

an annulus between the inner surface of the collar and the antenna winding, wherein the annulus includes an annular pressure, the annular pressure being equalized with a bore pressure in the central bore.

15. The downhole antenna according to claim 1, further comprising:

an annulus between the inner surface of the collar and the antenna winding, wherein the annulus is open to the fluid flow such that a portion of the fluid flow enters the annulus from an annulus opening and the fluid flow exits the annulus from the annulus opening.

16. The downhole antenna according to claim 1, wherein the chassis includes a first stabilization point and a second stabilization point, wherein the first stabilization point is located uphole of the antenna winding and the second stabilization point is located downhole of the antenna winding, and wherein a distance between the first stabilization point and the second stabilization point is less than 150% of a length of the antenna winding.

17. The downhole antenna according to claim 1, wherein the chassis includes a flow diverter disposed within the collar and configured to divert the fluid flow through the central bore of the collar from an annular flow to a tubular flow.

18. The downhole antenna according to claim 17, wherein the flow diverter includes:

a central connection including a wire port;

a cylindrical body; and a fin connecting the central connection to the cylindrical body, the fin including a wire channel from the wire port to the antenna winding.

19. The downhole antenna according to claim 18, wherein the wire channel includes a plurality of bends inside the fin.

20. The downhole antenna according to claim 18, wherein the wire channel has an elliptical cross-sectional shape.

21. A method of communicating downhole, the method comprising:

transmitting data from a transmitter to the downhole antenna of claim 1, and pumping the fluid flow from a downhole surface such that all the fluid flow past the antenna winding flows through the secondary bore of the chassis.

* * * * *